Sept. 26, 1972 B. E. ANDERSON ET AL 3,694,245

THERMOGRAPHIC STENCIL SHEET, MANUFACTURE THEREOF, AND METHOD OF MAKING AN IMAGED STENCIL SHEET

Filed April 22, 1971

INVENTORS
BROR E. ANDERSON
MARGERY L. SCHICK

Johnston, Root, O'Keeffe, Keil, Thompson & Shurtleff ATTORNEYS

United States Patent Office 3,694,245
Patented Sept. 26, 1972

3,694,245

THERMOGRAPHIC STENCIL SHEET, MANUFACTURE THEREOF, AND METHOD OF MAKING AN IMAGED STENCIL SHEET

Bror E. Anderson, 7 W. Cedar, Arlington Heights, Ill. 60005, and Margery L. Schick, 810 S. See Gwun, Mount Prospect, Ill. 60056

Continuation-in-part of application Ser. No. 674,153, Oct. 10, 1967. This application Apr. 22, 1971, Ser. No. 136,373
Int. Cl. B41n 1/24
U.S. Cl. 117—35.5 23 Claims

ABSTRACT OF THE DISCLOSURE

The invention relates to a thermographic stencil sheet which may be imaged by heat generated by infra-red ray absorption and which includes an ink-pervious base sheet and an ink-impervious coating thereon of a heat-flowable composition containing a film-forming thermoplastic cellulose ester and plasticizing material that is partially but incompletely compatible with the film-former. A radiation absorbing, heat generating material may be incorporated in the stencil sheet for generating the heat necessary for imaging. Certain embodiments of the stencil sheet also may be imaged by pressure. The stencil sheet may be employed in an assembly with a contacting absorbent sheet which absorbs part of the heated portion of the coating composition. The stencil sheet is made by coating the base sheet with a solvent solution of the heat-flowable composition, and removing solvent from the coated base sheet. The sheet is imaged by exposing an original in contact with the sheet to infra-red radiation to generate heat in the image areas of the original sufficient to render the composition flowable in the image areas of the stencil sheet, and causing the composition to flow from the image areas as by absorption by the absorbent sheet to form corresponding ink-transmitting opening in the stencil sheet. Alternatively, the stencil sheet containing radiation absorbing material is imaged by exposing the sheet to infra-red radiation through a negative original to render the composition flowable in the image areas. The composition is then caused to flow from the image areas.

RELATED APPLICATION

This is a continuation-in-part of application Ser. No. 674,153, filed Oct. 10, 1967, now abandoned.

BACKGROUND OF THE INVENTION

This invention relates to a thermographic stencil sheet of the type which includes a layer of a heat-flowable composition, to the manufacture thereof, and to a method of making an imaged stencil sheet by subjecting image areas of the stencil sheet to heat generated by infra-red ray absorption. The invention also relates to stencil sheet assemblies employed in making the imaged stencil sheet.

The desirability of providing a stencil sheet from which an imaged stencil sheet or duplicating master may be made directly from an original has long been recognized. Thus, for example, U.S. Pat. No. 2,808,777 to Roshkind is directed to the production of an imaged stencil sheet employing a thermographic stencil sheet which includes a continuous layer of a heat-flowable ink-impervious composition. Image areas of the stencil sheet are subjected to heat generated by infra-red ray absorption on an original in contact therewith to render the composition flowable in the image areas, and the composition is caused to flow from the image areas and thereby form corresponding ink-transmitting image openings in the stencil sheet. However, so far as we are aware, such thermographic stencil sheets and imaging methods have not achieved commercial success, owing to the poor quality of the imaged stencil sheets. In particular, image characters were feathered, producing ragged copy. The stencil openings were incompletely formed, so that the printed characters were broken. Letter centers tended to flow out rather than remain in place on the stencil, thereby filling in the centers on the printed copy, especially with the more difficult letters such as the small letters "e," "a," and "g."

A large demand exists among shippers of package goods for efficient methods of addressing multiple package shipments. In one method in wide commercial use, a small stencil sheet is attached to the face of a set of shipping forms in the addressee area. This assembly or composite is supplied in quantity to computer printer or accounting machines, or is individually inserted in typewriters. The addressee designation is printed or typed simultaneously on both the stencil sheet and the shipping form in each assembly. The resulting imaged stencil sheet is separated and employed by the shipping department in a hand printer for addressing a number of packages to be shipped to the same addressee.

It would be a distinct advantage to shippers if the stencil imaging operation could be performed efficiently in the shipping department, while omitting the stencil sheet from the shipping form set. Thus, where both single package and multiple package shipments are made, it may be preferable to address the single package shipments in another manner, without using a stencil, while multiple package shipments are addressed with a stencil. Inasmuch as most computer printer and accounting machine systems cannot select between stencil and non-stencil forms, waste is caused by the unnecessary use of stencil forms for single package shipments. Also, the foregoing method is impractical where the number of multiple package shipments is relatively small. If the shipping department could cut stencils of suitable quality in an efficient manner, it could perform the addressing operation selectively and without waste for multiple shipments of any size. In addition, elimination of the stencil layer from the set of forms would increase the number of form copies that could be made with the desired legibility.

The provision of a thermographic stencil and an imaging method that may be employed to make an imaged stencil directly from the shipping department copy of a shipping form would increase the efficiency of shipping operations by current users of the stencil addressing method and would make the method practical for many potential users, especially those having a relatively small number of multiple carton shipments. A thermographic stencil and imaging method that can be employed to produce imaged stencils of suitable quality directly from various other originals similarly would be desirable for many commercial and business purposes.

The prior art, as exemplified by the above-identified U.S. Pat. No. 2,808,777, discloses the use of thermographic stencil sheets which include a layer of a heat-flowable composition formed of various waxy or resinous materials and modifying agents such as plasticizers. Similar compositions are employed on type-impressible stencil sheets, and some of the stencil sheets also may be imaged by methods employing heat or a heated object. Typing stencils currently are made to a large extent with solvent applied coating compositions that include nitrocellulose, mineral oil, and other plasticizers. U.S. Pat. No. 3,062,675 to Shelffo also discloses a hot melt coating for typing stencils containing ethyl cellulose, high melting and high boiling plasticizers, and lightweight mineral oil.

While various of the stencil sheets disclosed in the prior art may be imaged thermographically in the manner contemplated in the present invention, we are aware of no disclosure of a stencil sheet which meets minimum requirements for commercial use in this manner. In this connection, the minimum quality suitable for shipping operations as described above is that obtainable mechanically with computer printers. Using standard size characters on the original, the imaged stencil sheet should produce readily legible copy in direct carton labeling using the stencil on a hand printer. The copy should be substantially uniform with a minimum of feathering, brokenness, and filling in of letter centers for readability during shipment, frequently under poor light. Also, the stencil sheet should not exhibit "pinholing," permitting ink to pass through unimaged areas and obscuring the copy. On the other hand, the copy need not have the quality of business correspondence, but where quality of such order is achieved, it constitutes an additional advantage.

SUMMARY OF THE INVENTION

It has now been discovered in accordance with the invention that an imaged stencil sheet of commercially acceptable quality can be made thermographically to provide the above-described and other advantages, by employing a thermographic stencil sheet which includes an ink-impervious layer of a heat-flowable composition of a resinous thermoplastic ink-impervious film-forming material and plasticizing material partially but incompletely compatible with the film-forming material. Uniform imaging is achieved with a minimum of feathering, brokenness, and filling in of letter centers. The stencil sheet does not suffer from pinholing, even after extended aging. Prints made from the imaged stencil sheets are readily legible and generally comparable to prints made from stencils imaged by computer printers.

The invention provides a new thermographic stencil sheet which includes an ink-pervious base sheet, and an ink-impervious coating thereon of the foregoing composition. The new stencil sheet is employed to advantage in an assembly for making an imaged stencil sheet, which includes the stencil sheet and an absorbent sheet arranged for surface contact with the stencil sheet. In an additional embodiment of the invention, the assembly also includes a cover sheet arranged for covering the outer surface of the absorbent sheet.

The new thermographic stencil sheet is made in accordance with a preferred embodiment of the invention by coating the base sheet with a solvent solution of the composition, and removing solvent from the coated base sheet.

The invention further provides an improved method of making an imaged stencil sheet, wherein the imaged areas of the new thermographic stencil sheet are subjected to heat generated by infra-red ray absorption to render the composition flowable in the image areas, and the composition is caused to flow from the image areas to form corresponding ink-transmitting image openings in the stencil sheet.

BRIEF DESCRIPTION OF THE DRAWINGS

The attached drawings illustrate preferred embodiments of the invention, without limitation thereto. In the drawings, like elements are identified by like reference symbols in each of the views, and.

DESCRIPTION OF THE PREFERRED EMBODIMENTS

Figure 1:
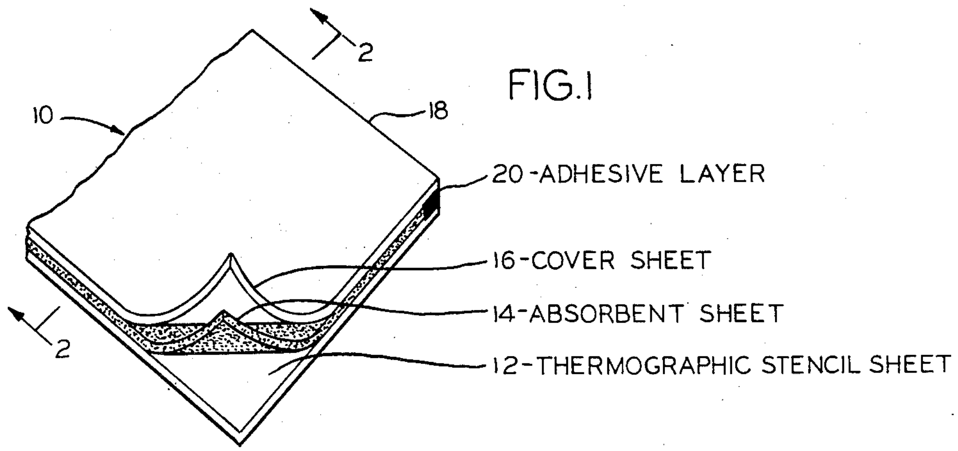
FIG. 1 is a fragmentary perspective view of an assembly for making an imaged stencil sheet which incorporates a thermographic stencil sheet according to the invention.
Figure 2:
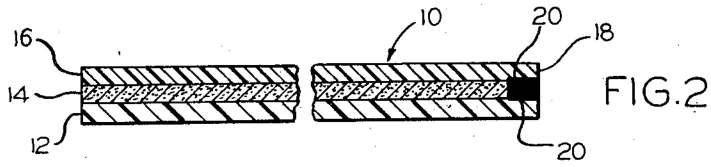
FIG. 2 is an enlarged broken cross sectional view of the assembly of FIG. 1, taken on line 2—2 thereof.

Referring to the drawings, particularly FIGS. 1–4, a stencil sheet assembly 10 for making an imaged stencil includes a thermographic stencil sheet 12, an absorbent sheet 14 in surface contact with the stencil sheet, and a cover sheet 16 arranged for covering the outer surface of the absorbent sheet. The sheets are secured together along one margin 18 by an adhesive layer 20. The portion of the assembly shown preferably constitutes the end of a long roll of material, wherein the adhesively joined margin 18 forms one side edge of the rolled material, for issuing, imaging, and dispensing successive lengths of stencil material. Alternatively, the assembly portion may constitute a part of a flat set of sheets cut for individual use.

In the preferred form of the invention, the thermographic stencil sheet 12 includes an ink-pervious base sheet which is coated and impregnated with a heat-flowable ink-impervious composition containing a thermoplastic cellulose ester film-forming material and plasticizing material partially but incompletely compatible with the film-forming material, as more particularly described hereinafter. An absorbent sheet 14 may be in surface contact with the stencil sheet to absorb the heated portions of the coating from the sheet to form an ink-transmitting image. Alternatively, a base sheet may be coated on one surface with the heat-flowable composition, and the other surface of the sheet may be substantially free of the composition to provide an absorbent layer in the stencil sheet supplementing the absorptive capacity of the absorbent sheet 14 or serving to replace the absorbent sheet.

The base sheet for the stencil sheet 12 preferably is a conventional mimeograph stencil base tissue or web. The absorbent sheet 14 may be a porous sheet of the same material or of other fibrous material such as cellulose wadding, in one or more plies.

Figure 5:
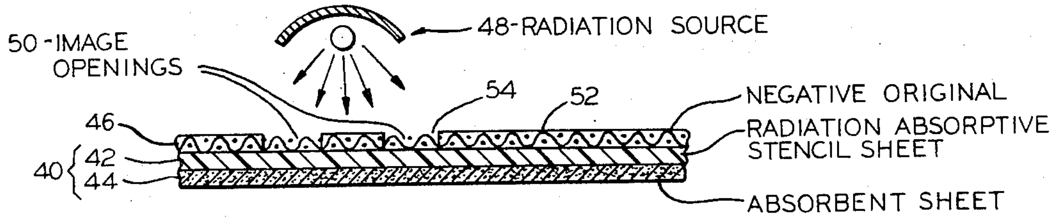
FIG. 5 is a fragmentary cross sectional diagrammatic view of another stencil sheet assembly according to the invention, and of a negative original employed therewith for making an imaged stencil sheet.

If a cover sheet 16 is employed, it forms a fluid barrier on the absorbent sheet. This avoids contact of the absorbed composition with other surfaces. The cover sheet may be any suitable flexible material, such as a thin sheet of polypropylene, transparent manifold paper or the like. The cover sheet and its function may be omitted entirely where contact of the absorbed fluid composition with other surfaces is of little consequence, as illustrated in FIG. 5.

Figures 3, 4:
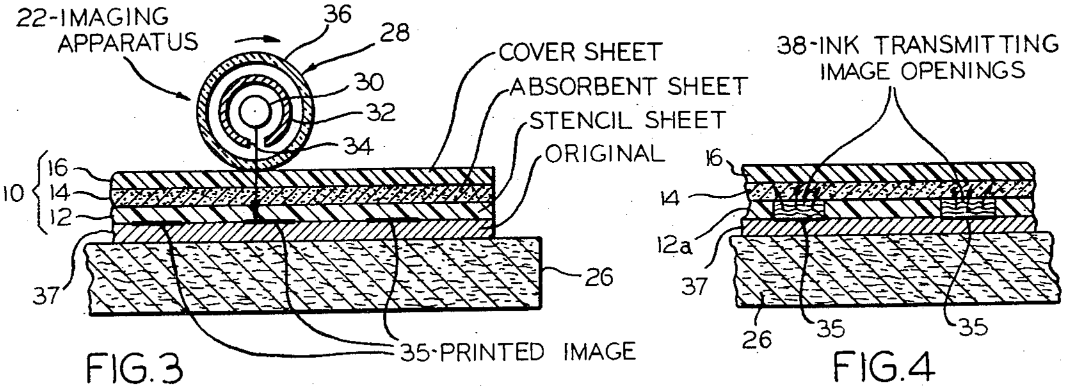
FIG. 3 is a fragmentary cross sectional diagrammatic view of the assembly of FIG. 1 in surface contact with a printed original, and of apparatus for making an imaged stencil sheet from said assembly.
FIG. 4 is similar to FIG. 3 and illustrates the stencil sheet assembly as it appears after imaging.

FIG. 3 illustrates a preferred method of making an imaged stencil sheet employing the assembly 10 and imaging apparatus 22. The apparatus includes a low heat conductivity pad 26, preferably made of felt or the like, and an irradiation device 28 mounted for rolling it over the surface of the pad. The device includes a source of infra-red radiation such as lamp 30, a tubular metal shield 32 around the radiation source having a slot 34 therein, and a glass roller tube 36 rollable on the pad 26. The slot is directed toward assembly 10 and extends across the assembly.

Stencil sheet 12 in assembly 10 is imaged by heat generated by infra-red ray absorption on printed image characters or copy 35 on the face of a graphic original 37. The areas surrounding the image characters are relatively low or non-infra-red ray absorbing, as in the case of typing or business form paper stock bearing characters typed or printed thereon in absorptive ink or carbon. First carbon copies are preferred in the above-described shipping operations, since the image density of the characters is more readily kept substantially uniform.

In the imaging method identified as "reflex" or "front printing," original 37 is supported face up on pad 26, and the stencil sheet assembly 10 is placed on the face surface of the original with stencil sheet 12 in contact therewith and with cover sheet 16 uppermost. The pad is raised to contact assembly 10 with the irradiation device 28. Radiation source 30 is energized, and the irradiation device is moved over the surface of the assembly, on the roller tube 36. The assembly thus is traversed or scanned with a transverse line of radiant energy directed through slot 34, through the stencil sheet assembly 10, and onto the upper surface of the original 37 and the image 35 thereon.

Radiation passes through the cover sheet, the absorbent sheet, and the stencil, before it reaches the image on the original. Over the non-image areas, the stencil is heated to some degree, primarily by absorption of some of the infra-red radiation by both the coating and the fibrous base sheet.

That portion of the infra-red radiation that is not absorbed in passing through the stencil assembly falls upon the original. In the non-image areas, much of the radiation passes through most business form originals; however, some radiation is absorbed and therefore there is a temperature rise in the non-image areas of the original. The radiation which passes through the non-image areas of the original passes into the underlay. The underlay, therefore, must be a relatively non-infra-red absorbing material, such as the felt pad 26, to avoid excessive transmission of heat back to the non-image areas of the stencil.

The infra-red rays that strike the image or copy areas are absorbed and the absorbed radiation is converted to heat energy. This heat is transmitted back to the stencil sheet 12, partly by conduction and partly by re-radiation. This additional heat in the image areas of the stencil is sufficient to raise the temperature in the image areas at least 30° F. higher than in the non-image areas. This causes the coating composition to flow in the image areas adjacent to the image 35 on the original. The fluid composition in the image areas is absorbed by the absorbent sheet 14, as represented by the arrows in FIG. 4, to leave ink-transmitting image openings 38 in the stencil sheet. An imaged stencil sheet **12*a* is thus formed which corresponds to original 37. The cover sheet 16 prevents the composition absorbed by the absorbent sheet 14 from coming into contact with the roller tube 36** and adhering thereto.

The foregoing method and apparatus have the advantage over present available thermographic imagers for use in imaging addressing stencils in that only the portion of an invoice or bill-of-lading that bears the "Ship To" address need be traversed by the infra-red lamp. However, conventional thermographic imagers may also be used.

While the reflex or front printing method of imaging is preferred for best results, the stencil sheet may, alternatively, be imaged by the "back printing" technique. In this technique, an original is placed in contact with the stencil sheet with the image on the inner surface of the original. The original is irradiated to generate heat in the image portions, while the non-absorptive unimaged portions reflect, transmit through, or otherwise dissipate the radiation, and heat is transmitted from the image portions in the original to the stencil sheet. The coating composition is reduced to flowable condition in the image portion of the stencil sheet, and the fluid composition is partially absorbed by an absorbent sheet on the opposite side of the stencil sheet from the original.

Figure 6:
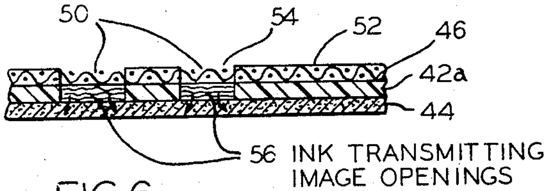
FIG. 6 is similar to FIG. 5, and illustrates the appearance of the stencil sheet assembly after imaging.

FIGS. 5 and 6 illustrate a stencil sheet assembly 40 including a stencil sheet 42 constituting another embodiment of the invention, and an absorbent sheet 44. The stencil sheet 42 is constructed as is stencil sheet 12 of FIGS. 1–4, and in addition, contains carbon black or other radiation absorbing, heat generating material distributed throughout the sheet, in or on the base sheet, and/or the coating composition. The absorptive material generates the heat necessary for imaging directly within or on the stencil sheet.

The stencil sheet assembly 40 may be imaged by interposing a negative original 46 between the stencil sheet and a radiation source 48. The negative original has radiation-transmitting image openings or areas 50 therein, and the openings are surrounded by radiation-opaque areas 52. In the illustrative embodiment, the original is constructed of silk screen, polyester film, or the like 54 coated with an opacifying substance in the opaque areas 52.

The embodiment of FIGS. 5 and 6 is especially advantageous for use with a negative original 46 which may be provided with large and/or varied image openings 50. The stencil sheet 42 is imaged by exposing the sheet briefly to radiation through the original 46, whereupon the coating composition of the stencil sheet is heated to the fluid state and absorbed by the absorbent sheet 44, as represented by the arrows in FIG. 6 Ink-transmitting image openings 56 are formed in the stencil sheet, duplicating the image openings 50 in the original.

An alternate method for use with a negative original is to use the same stencil sheet as in FIG. 1, but use an absorbent sheet 44 that is very high in infra-red absorbency. The assembly of stencil sheet and absorbent sheet likewise may be imaged in the manner illustrated in FIGS. 5 and 6.

Upon completion of the imaging operation in the manner illustrated in FIGS. 3 and 4, the imaged section of assembly 10 is removed from the supporting pad 26 and severed from the roll of material. Alternatively, the assembly is simply removed from the pad when separate assemblies are used. The cover sheet 16 and the absorbent sheet 14 are separated from the imaged stencil sheet **12*a* along the adhesively joined margin 18, whereupon the stencil sheet is ready for use. In the embodiment of FIGS. 5 and 6, the assembly of the imaged stencil sheet 42*a* and the absorbent sheet 44 is separated from the original 46**, and the stencil sheet is separated from the absorbent sheet for use.

As described hereinafter, certain embodiments of the stencil sheets 12 and 42 also may be imaged or stencilized by pressure, as by type keys or slugs, raised characters in a die, or a stylus. These stencil sheets may be printed before or after thermographic imaging with constant copy such as the shipper's identification, art work and the like, or with any desired additional image characters or designs.

Any of the stencil sheets may, alternatively, be imaged with constant copy by methods utilizing the thermographic properties. Thus, the constant copy may be applied to a sheet of suitable material having low infra-red absorptivity. Such a sheet may be employed as the cover sheet 16, or the sheet may be attached to an imaging machine or used in a carrier assembly, as an overlay for the stencil assembly. Alternatively, a similar sheet may be used as an underlay. The constant copy may be printed on the absorbent sheet or on a stencil backing. It becomes practical for the user to prepare his own constant copy, and changes can be made in the copy as often as necessary.

The stencil base tissue sheet may be formed of any suitable fiber, such as abaca, Kozo fiber, or Dacron, loosely arranged to provide a foraminous, highly permeable tissue. If the stencil sheet is imaged only thermographically, the fibers need not have the cut-out resistance necessary for imaging by mechanical means. Therefore, the tissue can contain a significant proportion of low cost fibers such as wood pulp or low denier viscose rayon.

The tiisue may weigh about 4½ to 12 pounds per 3000 square feet (24" x 36", 500 sheets), preferably about 5½ to 6½ pounds for carton addressing or general duplicating. The coating composition may be applied to the base sheet at a rate of about 14 to 24 pounds (dry basis), preferably about 20½ pounds per 3000 square feet. The thickness of the stencil sheet 12 or 42 preferably is in the range of about 1.5 to 3 mils, the lesser thicknesses being preferred in general for sharper copy by thermographic imaging. An exemplary thickness is 2.2 (the figure 2.7 in parent application Ser. No. 674,153 was a typographical error) mils for 6½ pound tissue and 20 pound coating.

The heat-flowable, ink-impervious coating provided in stencil sheets 12 and 42 is solid at ambient temperature, even though up to about 92% of its content may be liquid at room temperature. The coating preferably melts at a temperature of at least 150° F. and it is further preferred that the coating melt in the range of about 150–320° F., more preferably 200–300° F.

The foregoing temperatures are the preferred imaging temperatures reached in the stencil sheet by the methods illustrated in the drawings or in other ways. For good flowability, it is preferred that the composition have a viscosity, after melting, below about 3000 Saybolt seconds (SSU).

While incomplete compatibility or partial incompatibility of the materials in the heat-flowable composition is needed to produce the improved results of the invention, the incompatibility should not be manifest in the stencil sheet coating. Rather, the coating in general should be homogeneous, continuous, and free of perforation. In the absence of pigment or the like, the stencil usually will also appear clear. It has been found further that these conditions are achieved by depositing the composition on the base sheet from a solution thereof. The stencil coating formed in this manner is a uniform gel. On the other hand, deposition by a conventional hot melt application results in separation of the composition into two phases on the base sheet with consequent permeability to ink due to pinholing.

The coating composition preferably is completely soluble in a volatile solvent at a temperature below about 140° F. More preferably, the composition is completely soluble at room temperature. The composition preferably forms a substantially clear, homogeneous and continuous imperforate coating when deposited from the solution.

In this connection, reference to clarity of the coating herein, as an index of compatibility, is to be understood as being exclusive of the effects of additives other than the basic film-forming and plasticizing materials, such as pigments. The preferred embodiments of the coating composition are soluble in organic solvent mixtures of aromatic hydrocarbons, and aliphatic esters and/or aliphatic alcohols, and are deposited on the base sheet from solution therein by evaporation of the solvent.

The heat-flowable composition includes a resinous thermoplastic cellulose organic ester film-forming material, i.e., a material capable of forming a continuous, cohesive, flexible, ink-impervious film. The film-forming material preferably melts or is plasticizable to melt in the range of about 150–320° F. The film-forming materials are thermoplastic cellulose organic esters of acetic, propionic, butyric and/or valeric acid and mixtures of said esters with addition polymers and copolymers, particularly vinyl polymers. Esters containing at least 35% butyryl and/or valeryl groups are preferred. Cellulose acetate butyrate, cellulose acetate propionate, cellulose acetate valerate, and cellulose propionate butyrate are further preferred. In this connection, the nitrocellulose conventionally employed in typing stencils is not thermoplastic or capable of being made so with plasticizer and therefore is not contemplated for use in the invention, at least not in a substantial proportion of the film-forming material present.

Of the available grades of cellulose acetate butyrate, it is preferred to employ those having average values of about 35–55% butyryl content and about 1.5–13% acetyl content, by weight. The hydroxyl content varies from as low as 0.1 to 4.5% by weight. In the past, certain commercially available cellulose acetate butyrate products were stated by the manufacturer to contain an average of 0.7% hydroxyl content. Subsequent investigation has shown that this was an error as the average is much lower than this, some production lots containing as little as 0.1% hydroxyl and levels of 0.35–0.45% being common. The viscosity is about 0.25–6 seconds, by A.S.T.M. Method D–1343–54T in Formula A, A.S.T.M. Method D–871–54T. The melting or softening points most often range from about 265 to 360° F.

The proportion of the film-forming material may be in the range of about 8–50% by weight of the coating composition, including the film-forming and plasticizing materials. The amount of film-forming material required is inversely proportional to the film-forming strength of the material. The stronger film-formers, e.g., cellulose acetate butyrate cellulose acetate propionate, and other cellulose esters are preferably employed in a proportion of about 8–30% by weight of the composition. More preferably, the proportion of the film-forming material is about 16–20% of the composition when employing only such cellulose esters as the sole film-forming material. If the cellulose esters are mixed with weaker film-forming materials such as polystyrene, the total amount of film-former may be as high as 50%.

The foregoing and other proportions of the coating composition materials are set forth herein on a weight basis, which is the more practical method of formulating and is also the basis on which compositions more generally are described. Theoretically, a volume basis is more significant when substitutions of one component for another are being considered. Accordingly, the examples given hereinafter indicate proportions on both a weight and a volume basis. As illustrated by the examples, the volume ratio of the preferred cellulose acetate butyrate to the total plasticizing material in the coating composition preferably is in the range of about 1:13 to 1:2.5.

The film-forming material in the coating composition is combined with a plasticizing material which is partially but incompletely compatible therewith. The partially compatible material is defined to mean material which when mixed and heated with the film-forming material in selected proportions forms a homogeneous single phase melt, and when cooled from the melt to ambient or room temperature forms a two-phase mixture, at least one phase of the mixture incorporating substantial proportions of both the film-forming material and the plasticizing material. The materials employed in the preferred embodiments of the composition form a single phase melt at a maximum temperature of about 280–320° F. varying with the specific composition.

Upon cooling below the single phase melt temperature of the composition, the liquid separates into two phases. The temperature at which two phases form upon cooling is referred to herein as the compatibility temperature. The mixture remains fluid over a temperature range, and then the phase containing the major proportion of the film-former gradually hardens to a solid as the coating cools to room temperature. The remaining phase may solidify or may remain liquid at room temperature. A stencil coating formed by deposition from a solvent may melt at a temperature from below to above the compatibility temperature.

The manner in which the plasticizing material having partial but incomplete compatibility functions in the coating composition to provide the desired thermographic stencil is not readily ascertainable. It would have been expected that compatible materials would be more desirable, but we have discovered that a suitable degree of incompatibility produces good results, whereas when the plasticizing materials and the film-former are completely compatible, the results are poor, usually resulting in fuzzy copy.

The plasticizing material may constitute a single plasticizer, or may include a plurality of plasticizers. The plasticizers are substantially non-volatile substances which serve to modify the physical properties of the film-forming material, including the melting or softening point, compatibility, and/or flow properties. They may be either liquid or solid at temperatures from ambient temperature up to about imaging temperature, but at least must be liquid when mixed with other plasticizers at imaging temperature.

The plasticizers generally fall into three groups as regards compatibility with the film-forming material: partially but incompletely compatible, incompatible, and compatible substances. Certain of the partially compatible plasticizers may be employed as sole plasticizers. Alternatively, two or more plasticizers having individual compatibilities varying from complete compatibility to complete incompatibility may be employed, so long as the plasticizers together provide the proper balance of compatibility with the film-forming material. When a plurality of plasticizers is employed, it is preferred that they be compatible with each other at room temperature.

A preferred class of plasticizers for the cellulose esters includes oily substances, especially the mineral oils and more particularly, petroleum oils. The oily substances have varying degrees of compatibility. The preferred mineral oils, especially the petroleum oils, have a viscosity below about 10,000 Saybolt seconds (SSU) at 100° F., and, more preferably, have a viscosity above about 30 Saybolt seconds at 100° F. Depending upon the number of ingredients in the composition, mineral oil may be employed in a proportion in the range of about 0 to 90%, by weight of the composition, including film-forming and plasticizing materials.

Our work indicates that the aniline point of a mineral oil furnishes a significant index of compatibility with the film-forming material. Thus, an aniline point falling within a given range is an indication that the oil is suitable for use as the sole plasticizer for a given film-forming material. An aniline point falling within another range is an indication that the oil is suitable for use as a plasticizer in combination with a second plasticizer for the film-forming material. The useful ranges vary with the composition of the film-forming material.

Mineral oils having aniline points preferably in the range of about 50° F. (mixed aniline point) to about 130° F. (straight aniline point) for oils that are primarily naphthenic or paraffinic, or to about 160° F. (straight) for oils that contain more than about 35% aromatic hydrocarbons, have the desired partial but incomplete compatibility and may be employed advantageously as the sole plasticizers with certain cellulose acetate butyrates. (Aniline points are determined by A.S.T.M. Test D-1012-62.) Certain available petroleum products have aniline points in the desired range. Other products may be blended in appropriate proportions to provide aniline points in the range. Oil products and product blends having higher aniline points, i.e., above about 130-160° F. (straight), in general have a relatively low compatibility and, preferably, are employed together with a more compatible plasticizer.

Other oils and oily products, such as vegetable oils and alcohols derived from animal oils may be employed in the composition. An example of a vegetable oil is castor oil, and an example of an animal oil derivative is oleyl alcohol. These oils have been found to be relatively compatible with cellulose acetate butyrate, requiring additional, less compatible plasticizers to obtain the proper degree of incompatibility for optimum performance.

Oily plasticizers having relatively low compatibility with cellulose acetate butyrate include such substances as polyisobutylene having an average molecular weight preferably in the range of about 400-1500. Suitable compatibility is provided by incorporating additional plasticizing material having greater compatibility with the film-forming material.

Another plasticizer having relatively low compatibility with cellulose esters such as cellulose acetate butyrate is pentaerythritol tetrastearate.

A preferred class of plasticizers for use with other plasticizers having low compatibility with the film-forming material includes substances having generally good compatibility with both the film-forming material and with the remaining plasticizers. Plasticizers of this class are, accordingly, termed "compatibilizers." The class includes both non-oily and oily substances.

The preferred compatibilizers for use with cellulose esters include derivatives of the acid constituents of rosin, known as resin acids. Especially preferred are the esters of resin acids or of hydrogenated resin acids, including such derivatives of the resin acids both in refined form and as present in rosin, about 90% of which constitutes resin acids. The resin acids are chiefly the abietic acid type, and abietic acid is the major constituent of the acids.

Preferred esters include the methyl, pentaerythritol, glycerol, and polyol esters. It is especially preferred to employ a methyl ester hydrogenated rosin, which may be employed in an amount up to 72% by weight of the composition, depending upon the nature and proportions of the remaining ingredients.

Additional compatibilizers include sorbitan monooleate and substituted oxazolines.

It will be evident that the degree of compatibility will vary with the film-forming material. Thus, for example, many plasticizers that are balanced to obtain a certain degree of partial compatibility with one grade of cellulose acetate butyrate may tend to be either too compatible or insufficiently compatible with a different grade of cellulose acetate butyrate, or in a mixed formula containing film-formers other than cellulose esters, or when the film-former is cellulose acetate valerate or cellulose propionate butyrate.

Plasticizers are classed as primary, where high compatibility exists at room temperature, or secondary, where compatibility is limited at room temperature. The large to completely incompatible plasticizers employed in this invention to balance the use of sizeable amounts of compatible plasticizers, would generally be classed as secondary plasticizers. They are employed in amounts beyond their compatibility limits at room temperatures, and probably are even beyond their compatibility limits at imaging temperatures. The entire plasticizer mix must be partially but incompletely compatible at room temperature, but can be completely compatible at imaging temperature.

The film-forming and plasticizing materials are selected and blended in proportions so as to provide the above-described properties. For optimum results, it may be necessary to adjust the ingredients of the composition and their proportions on the basis of observed results, i.e., the uniformity, featherness, brokenness, pinholing, and secondary characteristics, as will be seen from the description which follows.

The preferred cellulose ester coating compositions may be formulated with the ester and one or more oily plasticizers, having the proper partial compatibility, or with cellulose ester, one or more low compatibility plasticizers, and one or more compatibilizing plasticizers. Such compositions provide stencil sheets exhibiting the desired primary characteristics of uniformity, little feathering or brokenness, and no pinholing or ink-through.

Optimum balancing of compatibility in the compositions provides desirable secondary characteristics in use or in manufacturing. Such characteristics include stickiness of the stencil, which may be evidenced before and during imaging, or only during imaging. Excessive stickiness before imaging may interfere with storage and handling. Slight stickiness during imaging may be desirable, to maintain good contact between the original, stencil sheet, and absorbent sheet, particularly when the original is removed from the imaging device, with the imaged stencil adhering to it. Excessive stickiness may interfere with separation of the sheets following imaging.

Another significant secondary characteristics is oiliness, before and during imaging, or only during imaging. Oiliness prior to imaging may be undesirable for handling and storage. Oiliness during imaging may tend to feather the original copy, which may be undesirable if the original is to be employed more than once for making an imaged stencil sheet, and may also impair the appearance of the original.

Additional secondary characteristics include speed of imaging or stencilization, durability, drying rate during manufacturing, and other manufacturing characteristics. Maximum imaging speed is desirable for minimum operator time by the user. However, the difference in rate between fast and slow imaging frequently may be of little importance to the user since this difference may be only a second or two even with an 18-inch long stencil assembly for general duplicating. The durability requirements vary with the nature and amount of use intended for the stencil sheet. The manufacturing characteristics desirably are optimum for maximum production efficiency.

The selection of coating composition ingredients providing the proper balance of compatibility involves few definite criteria and at best is somewhat empirical. Those materials which have been found to be most useful form a clear homogeneous single phase melt when heated together if no pigment is present, preferably at a maximum temperature of about 280–320° F. as noted above. When the melt is cooled, the film-forming material generally hardens at a temperature considerably lower than its original melting point. Upon cooling to room temperature, two phases are present, at least one of which incorporates substantial proportions of both the film-forming material and the plasticizing material. The two phases may be readily discernible as two layers, or appear as a cloudy or opaque product, where one phase is suspended in the other.

It has been observed that too-compatible mixes upon cooling to room temperature from a single phase melt tend to harden slowly and may remain soft and sticky. The too-incompatible mixes exhibit hardening of the film-forming material at a relatively high temperature, and two very distinct phases are present long before the material cools to room temperature. The film-former phase contains only a relatively small amount of plasticizer.

Mixtures of film-forming material and plasticizing material exhibiting partial but incomplete compatibility are best evaluated by preparing a stencil sheet therefrom, imaging the sheet and observing the results. A too-compatible mixture may produce a feathered copy. The stencil may also dry too slowly and be sticky to the touch. A stencil formed from a too-incompatible composition produces copy that often exhibits pin-holing or inking through. Also, stencil durability is relatively low. The much too-incompatible mix results in a stencil which generally exhibits a white cast, and is excessively oily during the imaging process. Generally also, the too-compatible composition images at a fast speed wherea sthe too-incompatible composition images at a relatively slow sleed.

The film-forming materials preferably are employed in the lowest proportions which provide good film coverage on the stencil and sufficient durability. Increasing the proportion decreases the imaging speed and increases the cost of the composition. Consequently, adjustments to the composition for increasing or decreasing the compatibility to provide optimum results preferably are made in the plasticizing material ingredient or ingredients. Thus, in a composition of film-former and oily plasticizer, the type or grade of a single oil, or the type, grade and relative proportions of blended oils may be varied to provide greater or lesser compatibity. In a composition that includes a low-compatibility plasticizer, and a compatibilizer, the proportions of the plasticizers may be adjusted relative to each other and/or one or more of the plasticizers may be substituted by another plasticizer which exhibits greater or lesser compatibility, as is needed. It is also possible to make adjustments in the quantity of film-forming materials, within the limits of proper film coverage and desired imaging speed.

Certain specific compositions have been found to be preferable. One such composition wherein mineral oil constitutes the sole plasticizer contains about 13–30% of cellulose acetate butyrate and about 70–87% of petroleum oil, by weight. In this composition, the cellulose acetate butyrate preferably has a butyryl content of about 46–55%, an acetyl content of about 1.5–7%, and a viscosity of about 0.8–6 seconds ( the viscosity may be as low as 0.2 second), by the above A.S.T.M. method. The petroleum oil, which may constitute blended products, preferably has an aniline point in the range of about 50° F. (mixed) to about 160° F. (straight), as previously described.

Another preferred composition contains about 13–30% of cellulose acetate butyrate, about 40–87% of petroleum oil, and about 0–47%, more preferably 10–47% of an ester of a resin acid or of a hydrogenated resin acid, by weight. In this composition, the cellulose acetate butyrate preferably has a butyryl content of about 46–55%, an acetyl content of about 1.5–7%, and a viscosity of about 0.25–6 seconds. The petroleum oil preferably has an aniline point in the range of about 100–180° F. (straight).

An additional preferred composition contains about 13–19% of cellulose acetate butyrate, about 10–35% of petroleum oil, and about 45–72% of methyl ester of a hydrogenated resin acid, by weight. In this composition, the cellulose acetate butyrate preferably has a butyryl content of about 46–55%, an acetyl content of about 1.5–7%, and a viscosity of about 0.25–6 seconds. The petroleum oil preferably has an aniline point in the range of about 160–240° F. (straight).

Another preferred composition contains about 13–30% of cellulose acetate butyrate, about 10–60% of petroleum oil, about 0–20% of polyisobutylene, and about 15–72% of an ester of a resin acid or of a hydrogenated resin acid, by weight. In this composition, the cellulose acetate butyrate preferably has a butyryl content of about 35–55%, an acetyl content of about 1.5–13%, and a viscosity of about 0.25–6 seconds. The aniline point of the petroleum oil may range from 50° F. (mixed) to 240° F. (straight). The polyisobutylene preferably has an average molecular weight in the range of about 400–1500.

In producing a radiation absorbing stencil sheet, as in FIG. 5, a radiation absorbing pigment or dye is dispersed in the coating composition. Preferably, about 1–5% of carbon black is incorporated, by weight of the complete composition. Alternatively, an absorbing pigment or dye may be provided on the base sheet prior to deposition of the coating thereon. Preferably, carbon black is applied to the base sheet at a rate of about 0.1–1.2 pounds per 3,000 square feet.

For most stencils, it is desirable to have some color added. It is preferred to add enough of a low infrared absorbing dye, such as 0.1 g. of oil yellow per 100 g. of dry coating, to tint clear stencils. This makes the stencil sheets more readily visible during assembly with the white absorbent sheet and the thin translucent backing sheet. This coloring also makes the stencils more visible on a hand printer, so that it is easier to place a stencil on a printer without wrinkling.

Other pigments and dyes, and other substances such as antioxidants may be added to the coating composition, in minor amounts, provided that they do not obviate the basic and novel characteristics of the stencil sheets. It is especially important that the additives do not adversely affect the infrared radiation absorptivity or the thermographic characteristics. In describing the composition and setting forth proportions herein, the possible presence of such additives is disregarded except where specifically indicated.

The stencil sheets 12 and 42 are prepared by coating and impregnating a stencil base sheet with the heat-flowable composition dissolved in a volatile solvent, followed by removal of solvent to deposit the composition on the base sheet. The preferred solvents are organic liquids and mixtures thereof, especially mixtures of an aromatic hydrocarbon, and an aliphatic ester, aliphatic alcohol, and/or aliphatic ether. Toluene is the preferred aromatic hydrocarbon, and preferably, it constitutes about 35–85% by weight of the solvent. The balance of the solvent preferably is a lower aliphatic ester and/or lower aliphatic alcohol, including particularly isopropyl acetate, ethyl acetate, and ethanol, although other solvents may be used. (Special Industrial Solvent, government formula C, was used in this work wherever ethanol is mentioned. However, other types of denatured 95% or anhydrous ethyl alcohol may be used.) The composition is dissolved in a solvent in a preferred concentration of about 30–45% solute, by weight.

Coating and impregnation of the base sheet with the solution may be accomplished in any suitable conventional manner, such as by immersion, roller, or slot coating with removal of excess material when necessary by doctor blades or the like. The coated sheet is air-dried at ambient or elevated temperature, preferably in continuous operation in a heated oven. The stencil sheet is dried to a residual solvent content which preferably is a maximum of about 0.5%.

It has been found that the stencil coating formed in the foregoing manner generally is irreversibly altered when heated to either its melting point or the compatibility temperature of the coating composition. Such heating may change the continuous phase gel structure of the coating to a semi-liquid two-phase mixture that renders the sheet useless as a thermographic stencil. Accordingly, the coated stencil base sheet is dried at a temperature below the melting point and the compatibility temperature, preferably at least 10° F. below the lower of the two temperatures.

In a preferred method of operation, a roll of sheet material is continuously coated at ambient temperature, or at a higher solution temperature up to about 140° F., if necessary to dissolve the composition. The coated sheet is conducted through a heated oven to remove solvent by evaporation, at a temperature as described above. The dried stencil sheet may be wound in a roll and stored for subsequent use. At the same time or thereafter, the stencil sheet may be assembled with an absorbent sheet as illustrated in FIG. 5, or with an absorbent sheet and a cover sheet as illustrated in FIG. 1.

The stencil sheet may be imaged as illustrated in the drawings or in other conventional ways, employing any suitable source of infra-red radiation, such as a tungsten filament lamp. The original in contact with the stencil sheet is exposed to radiation substantially instantaneously, i.e., on the order of about 0.03 to 0.1 second, to generate a temperature rise in the image portions of a printed original from about ambient temperature to a temperature sufficient to produce a temperature in the stencil sheet in the range of about 150–320° F. Where a negative original is employed as illustrated in FIG. 5, heat is generated directly in the stencil sheet 42. The coating composition in the stencil sheet is reduced to a flowable condition substantially instantaneously and a portion thereof is absorbed by the absorbent sheet immediately thereafter, to leave ink-transmitting image openings in the stencil sheet, as illustrated by the openings 38 and 56 in FIGS. 4 and 6. The openings are bridged by the fibers of the stencil base sheet and the base sheet fibers serve to retain letter centers and the like in place. The imaged stencil sheet is separated from the original and the absorbent sheet, and then is ready for use as a duplicating master.

The following examples illustrate the preparation of stencil sheets with various compositions employed in the invention, and they include illustrations of the results of varying the materials and proportions, and of the manner in which the compositions may be evaluated. It will be understood that the invention is not limited to the examples, which are merely illustrative, or to the materials, proportions, conditions and procedures set forth therein. In the examples, the proportions are by weight except where otherwise indicated.

Example 1

A coating composition was prepared with cellulose acetate butyrate as the film-forming material and a partially but incompletely compatible petroleum oil as the plasticizing material.

The cellulose acetate butyrate is identified as EAB–500–1 (Eastman Chemical Products), and has a butyryl content of 46 to 50.3% (average 48%), an acetyl content of 5.2 to 7.0% (average 6%), a hydroxyl content of 0.1 to 0.7%, a viscosity of 0.8 to 1.2 seconds, determined by the A.S.T.M. method set forth above, and a melting point range of 329–347° F. The petroleum oil is a refined aromatic oil identified as Mobilsol K (Socony Mobil Oil Company), and has a viscosity of 6117 Saybolt seconds at 100° F., an aniline point of 93° F., an API gravity of 11.0°, and a distillation range of from 430 to 720° F. (90%).

The components were employed in proportions of 16.4 parts of EAB–500–1 (14 ml./100 g. total non-volatiles) to 83.6 parts of Mobilsol K (84.3 ml./100 g. total non-volatiles), by weight.

An antioxidant, 2,6-di-t-butyl-p-cresol (Tenamene 3, Eastman Chemical Products), was added to the cellulose acetate butyrate solution to give a 0.5% concentration based on the weight of cellulose acetate butyrate. The antioxidant was added to minimize yellowing and odor development.

As a general procedure, this amount of Tenamene 3 was incorporated into all cellulose ester solutions before coating, in all subsequent examples.

The stencil sheet of this example had a light buff color, resulting from the use of Mobilsol K, which is dark brown. If colorless plasticizers had been used and a colored stencil were desired, a dye as described earlier could have been added.

The materials were dissolved at a concentration of about 40% by weight, in a solvent mixture containing 135.5 parts of toluene, 18.2 parts of ethyl acetate, and 12.8 parts of ethanol (C–1 alcohol), by weight. The materials were mixed at room temperature, with a solution of the film-forming material added last.

Stencil base tissue sheet material made of abaca fiber was coated and impregnated with the solution. The tissue weighed about 6½ pounds per 3000 square feet. The sheet material was coated with the solution by passing it through a bath containing the solution, removing excess fluid by a doctor rod, and air drying at ambient temperature.

The weight of dry coating on the sheet material was about 20½ pounds per 3000 square feet, and the residual solvent content was below about 0.5%. The thickness of the resulting stencil sheet was about 2¼ mils. The foregoing mixing, coating, and drying procedures or equivalent procedures, including drying with circulating air heated to about 130° F., were employed also in the subsequent examples.

For convenience in testing, the stencil sheet of this example and the stencil sheets of a number of subsequent examples were imaged in a Thermofax "Secretary" machine (3M Company). For this purpose, two plies of absorbent cellulose material, such as Dexter Corporation's 6½ lbs./3,000 sq. ft. tissue made primarily of abaca fibers, or Kimberly Clark's Kay-Dry toweling, made of wood pulp fibers, were placed on one side of the stencil sheet, and an original sheet was placed on the opposite side of the stencil sheet together with a cotton pad on the outer side of the original. The original was a carbon copy on business forms paper produced on a typewriter or on a data processing printer, and the printed face of the original was in contact with the stencil sheet. The assembly was supplied to the machine so that the radiation source faced the absorbent sheet side of the assembly for reflex printing, in a manner analogous to that illustrated in FIG. 3.

With the speed indicator of the machine set at 6⅔ (higher number indicates faster speed), very good prints were made, the prints being uniform, exhibiting little feathering or brokenness and no pinholing or inking through. The stencil was very slightly sticky but acceptable in this regard.

In this example, the cellulose acetate butyrate EAB–500–1 may be replaced by other grades of cellulose acetate butyrate such as Half-Second Butyrate (Eastman Chemical Products), and the Mobilsol K can be replaced by other oils such as Mobilsol 66 (Socony Mobil Oil Company).

Half-Second Butyrate has an average butyryl content of 37%, an average acetyl content of 13.5%, an average hydroxyl content of 2%, a viscosity of 0.3 to 0.5 second (A.S.T.M. method), and a melting point range of 311 to 329° F. Mobilsol 66 is an aromatic oil having a viscosity of 170 Saybolt seconds at 100° F., a mixed aniline point of 66° F., and a distillation range of from 638 to 819° F. (100%).

The Half-Second Butyrate is less compatible with mineral oil than the EAB–500–1 and is employed in a greater proportion (17 parts v. 16.4 parts by weight). The EAB–381 may be employed with an oil having an aniline point still lower than that of Mobilsol 66.

Example 2

Stencil sheets were made and tested as described in Example 1, employing cellulose acetate butyrate EAB–500–1 as the film-forming material and the partially but incompletely compatible refined aromatic petroleum oil Mobilsol N as the plasticizing material in the coating composition. The oil has a viscosity of 321 Saybolt seconds at 100° F., a mixed aniline point of 109° F. (approximately 83° F. straight), an API gravity of 12.5°, and a distillation range of from 601 to 745° F. (85%).

Stencil sheets prepared from compositions containing various ratios of film-forming material to plasticizing material were compared. Melt (compatibility temperatures) also were determined for the mixtures of film-forming material and plasticizing material, in the absence of solvent, and in each case, the composition was found to be compatible above about 270° F. The stencil sheets were imaged in the manner of Example 1 at optimum machine speed settings for the respective compositions. The results were as shown in the following table, in which increasing values for the machine setting represent increasing rates of travel through the machine and correspondingly decreasing exposure times:

| Composition number | EAB-500-1 Percent by wt.[1] | EAB-500-1 Ml./100 g. total n.v. | Mobilsol N Percent by wt.[1] | Mobilsol N Ml./100 g. total n.v. | Machine setting | Results |
|---|---|---|---|---|---|---|
| 1 | 9 | 7.7 | 91 | 92.5 | 7½ | Good prints; stencil too oily. |
| 2 | 13 | 11.1 | 87 | 88.5 | 7½ | Good prints; oily stencil. |
| 3 | 17 | 14.5 | 83 | 84.4 | 7 | Do. |
| 4 | 24 | 20.5 | 76 | 77.3 | 6½ | Good prints; best stencil. |
| 5 | 30 | 25.6 | 70 | 71.2 | 6 | Do. |
| 6 | 36 | 30.8 | 64 | 65.1 | 5½ | Good prints; stencil wrinkled. |
| 7 | 44 | 37.6 | 56 | 57 | 3½ | Fair prints; stencil wrinkled. |

[1] Percentages in this and subsequent examples are exclusive of antioxidants.

The stencils made from compositions Nos. 1–6 gave good prints, whereas the stencil made from composition No. 7 gave prints which would be acceptable only for limited use. The stencil made from composition No. 1 was, however, considered too oily to be suitable for commercial use. The best stencils were produced from compositions 4 and 5, these stencils having little surface oil and giving good prints.

The quality of the prints decreased progressively as the proportion of film-former increased in compositions 6 and 7, and the stencils became increasingly wrinkled due to underplasticizing. The wrinkling would cause handling problems with the stencil made from composition 7.

The imaging speed decreased progressively as the proportion of film-former increased, corresponding to a requirement for increasingly higher imaging temperatures in order to achieve optimum results.

The stencils made from compositions Nos. 1–5 are type-impressible, the ease of typing increasing with increasing oil content.

Example 3

Coating compositions were prepared with cellulose acetate butyrate EAB–500–1 as the film-forming material and combinations of varying proportions of two refined petroleum oil plasticizers as the plasticizing material.

A relatively compatible oil, Mobilsol 66 (an aromatic oil), and a relatively low compatibility oil, Benol (a paraffinic oil), were combined. Benol (Witco Chemicals) has a viscosity of 100 Saybolt seconds at 100° F., an aniline point of 224° F., an API gravity of 34.0°, and a distillation range of from 658 to 822° F. (100%).

The coating compositions were prepared, stencil sheets were made therewith, and the stencil sheets were evaluated in the manner described in Example 1. Also, the melt compatibilities of the several combinations of film-forming material and plasticizing material, in the absence of solvent, were determined. The compositions contained 17 parts by weight of EAB–500–1 (14.5 ml. per 100 g. total non-volatiles), and 83 parts by weight of plasticizers in the proportions and with the results as follows:

| Comp. No. | Mobilsol 66 Percent by wt. | Mobilsol 66 Ml./100 g. total n.v. | Benol Percent by wt. | Benol Ml./100 g. total n.v. | Compatibility temprea-ture ° F. | Machine setting | Results |
|---|---|---|---|---|---|---|---|
| 1 | 83 | 75 | | | 120 | 8¾ | Feathered prints. |
| 2 | 74.5 | 67.4 | 8.5 | 9.9 | 140 | 8½ | Do. |
| 3 | 67 | 60.6 | 16 | 18.7 | 170 | 8½ | Good prints. |
| 4 | 55 | 49.7 | 28 | 32.8 | 240 | 8½ | Good prints; best stencil. |
| 5 | 43 | 38.9 | 40 | 46.8 | 280 | 8 | Good prints. |
| 6 | 34.5 | 31.2 | 48.5 | 56.8 | 290 | 7⅔ | Broken prints and inks through. |

The stencils made from compositions 3, 4 and 5 are suitable for commercial use as thermographic stencils, and they are also type-impressible. Composition 4 provides an outstanding thermographic stencil which is also suitable for imaging by a computer printer. The aniline point of the mixture of oils used in composition 4 is 123° F. (straight) or 131° F. (mixed). The aniline point of the mixture of oils used in composition 5 is 156° F. (straight).

Compositions 1 and 2 are unsuitable for commercial use in thermographic stencils, the prints being feathered as a result of too much compatibility in the composition. Composition 6 is unsuitable for such use, the prints being broken and pinholed as a result of too little compatibility in the composition.

Blandol (Witco Chemicals), a refined petroleum oil having a viscosity of 85 Saybolt seconds at 100° F. and an aniline point of 220° F., was substituted for Benol in the above compositions 2 and 4, in the same proportions, and no significant differences were noted.

Composition 4 has a compatibility temperature of about 240 to 250° F. Studies conducted on the dried stencil coating indicated that its melting point was about 260° F., at which temperature the coating changed from a gel formation to a single phase liquid. Upon cooling to the compatibility temperature, the liquid separated quickly into two phases. Further cooling resulted in solidifying the film-former phase and increasing the viscosity of the plasticizer phase.

Compositions 3 and 4 were prepared as hot melts and coated on stencil base tissue sheet material at temperatures well above their compatibility temperatures. Composition 3 produced an opaque oily stencil, whereas when deposited from solvent solution, the composition produced a clear, non-oily, stencil. Thermographic prints from the freshly coated hot melt stencil were nearly as good as from solvent application, but the oil exuded readily from the stencil in a short time, leaving a pinholed coating.

Composition 4 produced a hot melt stencil having a large excess of oil on its surface which could be blotted off readily, leaving a pinholed coating. Thermographic prints from the stencil were fairly good, but the pinholing precluded any commercial use of the stencil.

As noted above, composition 1 is too compatible for best results. The stencil coating melts well above the compatibility temperature of the composition. The compatibility of the two-component composition may be decreased by employing a lower than optimum proportion of the film-former, EAB–500–1. Thus a composition of 12% EAB–500–1 and 88% Mobilsol 66, by weight, provides a stencil having fairly good primary characteristics. The lower portion of the film-former results in a lower melting coating having a compatibility temperature similar to composition 1, i.e. 120° F., with consequent favorable lower differential between melting and compatibility temperatures. The durability of the stencil containing the lower proportion of film-former is greatly reduced, but it is sufficient for addressing a limite number of cartons.

Example 4

Coating compositions were prepared with cellulose acetate butyrate EAB–500–1 as the film-forming material and combinations of varying proportions of Benol petroleum oil and a compatibilizing plasticizer as the plasticizing material. The compatibilizing material was Hercolyn D (Hercules Powder Company), a hydrogenated methyl ester of rosin purified by steam distillation, a liquid having a Gardner-Holdt viscosity at 25° C. of Z2–Z3 and an acid number of 7.

The coating compositions were prepared, the stencil sheets were made and evaluated, and melt compatibilities were determined as described in Examples 1 and 2. The compositions and results were as follows:

| Composition number | EAB-500-1 Percent by weight | EAB-500-1 Ml./100 g. total n.v. | Benol Percent by weight | Benol Ml./100 g., total n.v. | Hercolyn D Percent by weight | Hercolyn D Ml./100 g., n.v. | Compatibility temperature, ° F. | Machine setting | Results |
|---|---|---|---|---|---|---|---|---|---|
| 1 | 17 | 14.5 | | | 83 | 82.2 | (1) | | Stencil did not dry. |
| 2 | 16.1 | 13.8 | 11.4 | 13.3 | 72.5 | 71.8 | 120 | | Stencil did not dry sufficiently. |
| 3 | 17 | 14.5 | 23 | 26.9 | 60 | 59.4 | 220 | 7 | Good prints. |
| 4 | 17 | 14.5 | 30 | 35.1 | 53 | 52.5 | 250 | 7 | Good prints; good durability; good pressure sensitivity. |
| 5 | 17 | 14.5 | 34 | 39.8 | 49 | 48.5 | | 7 | Good prints. |
| 6 | 17 | 14.5 | 52 | 60.8 | 31 | 30.7 | 350 | | Inks through. |

(1) Room temperature.

The pressure sensitivity of the stencils made from compositions 4 and 5 was suitable for most computer printers. Composition 3 is impressible by typewriters and accounting machines.

Other cellulose esters such as cellulose acetate valerate, cellulose propionate butyrate and cellulose butyrate valerate would produce useful stencils.

Blandol, or any petroleum oil similar to Blandol or Benol in aniline point and viscosity, may be substituted for Benol in the above compositions.

Example 5

The following compositions provided good quality stencils which gave good thermographic prints in the manner of the preceding examples:

| Comp. No. | Material | Proportions: Percent by weight | Proportions: Ml./100 g., total n.v. |
|---|---|---|---|
| 1 | Cellulose acetate butyrate, EAB-500-1 | 15.7 | 13.4 |
| | Petroleum oil, Mobilsol 66 | 64.5 | 58.3 |
| | Petroleum oil, Benol | 19.8 | 23.2 |
| 2 | Cellulose acetate butyrate, EAB-500-1 | 17 | 14.5 |
| | Petroleum oil, Sun oil 991 | 54 | 58.8 |
| | Hydrogenated methyl ester of rosin, Hercolyn D. | 29.2 | 28.9 |
| 3 | Cellulose acetate butyrate, EAB-500-1 | 17 | 14.5 |
| | Petroleum oil, Mobilsol L | 22 | 24.7 |
| | Petroleum oil, American No. 11R industrial oil. | 11 | 12.3 |
| | Hydrogenated methyl ester of rosin, Hercolyn D. | 50 | 49.5 |

Mobilsol L (Socony Mobil Oil Company) is a refined naphthenic petroleum oil having a viscosity of 61 Saybolt seconds at 100° F., an aniline point of 162° F. (straight), an API gravity of 25.7°, and a distillation range of from 490 to 708° F. (100%). Sun oil 991 (Sun Oil Company) is a refined naphthenic petroleum oil having a viscosity of 108 Saybolt seconds at 100° F., an aniline point of 145° F. (straight), and an API gravity of 22.5°. American Oil Company No. 11R industrial oil has a viscosity of about 105 Saybolt seconds at 100° F., an aniline point of 197° F., and an API gravity of about 28°.

The aniline point of the oil mixture of composition 1 is 110° F. (straight). The aniline point of the oil mixture of composition 3 is 169° F. (straight).

Example 6

The following compositions provided good quality stencils which gave good thermographic prints in the manner of the preceding examples, and also were type-impressible:

| | | Proportions | |
|---|---|---|---|
| Comp. No. | Material | Percent by weight | Ml./100 g., total n.v. |
| 1 | Cellulose acetate butyrate, EAB-500-1 | 18.0 | 15.4 |
| | Petroleum oil, Benol | 23.6 | 27.6 |
| | Hydrogenated methyl ester of rosin, Hercolyn D. | 58.4 | 57.8 |
| 2 | Cellulose acetate butyrate, EAB-500-1 | 17.2 | 14.7 |
| | Polyisobutylene, Polyvis 10 SH | 24.6 | 27.7 |
| | Hydrogenated methyl ester of rosin, Hercolyn D. | 58.2 | 57.5 |
| 3 | Cellulose acetate butyrate, EAB-531-1 | 18 | 15.4 |
| | Petroleum oil, Benol | 10 | 11.7 |
| | Hydrogenated methyl ester of rosin, Hercolyn D. | 72 | 71.3 |

Polyvis 10 (Cosden Oil and Chemical Company) is an oily liquid synthetic monoolefin polymer produced by a low temperature catalytic process from raw material containing polymerizable olefins, particularly isobutylene. The polymer has an average molecule weight of 940 and a Saybolt viscosity at 100° F. of 41,000. EAB-531-1 (Eastman Chemical Products) has a butyryl content of 50%, an acetyl content of 2.8%, and an hydroxyl content of 2.0%, by weight. The viscosity by the A.S.T.M. method described hereinabove is 1–2 seconds, and the melting point range is 266–338° F.

Example 7

The following compositions deposited from the described solution provided stencils which gave good thermographic prints in the manner of the preceding examples. The durability of the stencil from composition 1 was low, owing to the low proportion of film-former.

| | | Proportions | |
|---|---|---|---|
| Comp. No. | Material | Percent by weight | Ml./100 g., total n.v. |
| 1 | Cellulose acetate butyrate, EAB-500-1 | 8.5 | 7.3 |
| | Polyisobutylene, Polyvis 10 SH | 22.8 | 25.6 |
| | Hydrogenated methyl ester of rosin, Hercolyn D. | 68.7 | 68.0 |
| | 38% solution in 120.5 parts toluene and 42.5 parts isopropyl acetate. | | |
| 2 | Cellulose acetate butyrate, EAB-500-1 | 10 | 8.5 |
| | Polyisobutylene, Polyvis 10 SH | 22 | 24.7 |
| | Hydrogenated methyl ester of rosin, Hercolyn D. | 68 | 67.4 |
| | 37% solution in 119.5 parts toluene and 50 parts isopropyl acetate. | | |
| 3 | Cellulose acetate butyrate, ASB | 17 | 14.5 |
| | Sorbitan monooleate, Span 80 | 16.6 | 16.6 |
| | Hydrogenated methyl ester of rosin, Hercolyn D. | 66.4 | 65.7 |
| | 39.7% solution in 118 parts toluene, 16.9 parts ethyl acetate, and 16.9 parts ethanol (95%). | | |
| 4 | Cellulose acetate butyrate, half-second butyrate. | 16.4 | 14.0 |
| | Petroleum oil, Mobilsol L | 22.6 | 25.4 |
| | Maleated pentaerythritol ester of rosin, Pentalyn 830. | 61 | 57.0 |
| | 44% solution in 80 parts toluene and 20 parts ethanol (95%). | | |

Cellulose acetate butyrate, ASB (Eastman Chemical Products) is alcohol-soluble and has an average butyryl content of 47.2%, an average acetyl content of 1.6%, an average hydroxyl content of 4.53%, a viscosity of 0.3 second by the A.S.T.M. method set forth above, and a softening point of 356° F. Span 80 (Atlas Chemical Industries) is an oily liquid non-ionic emulsifier having a viscosity at 25° C. of approximately 1000 centipoises, an acid number of 5.5–7.5, a saponification number of 149–160, an hydroxyl number of 193–209, and a water content of 0–0.5%.

Pentalyn 830 (Hercules Powder Company) is an alcohol-soluble maleated pentaerythritol ester of rosin having as typical properties: a softening point of 241° F. by the Hercules drop method, a Gardner-Holdt viscosity at 25° C. of E at 60% concentration in ethanol, and an acid number of 78.

Example 8

Coating compositions were prepared with combinations of relatively low compatibility plasticizers together with one or more compatibilizing plasticizers, to provide a plasticizing material partially but incompletely compatible with the film-forming material. Compositions 1–4 were dissolved in concentrations of about 38% in a solvent mixture of 79 parts toluene and 85 parts of isopropyl acetate, by weight. Composition 5 was dissolved at 38% concentration in a mixture of 96.4 parts of toluene and 90.2 parts of isopropyl acetate. Composition 6 was dissolved at 29.4% concentration in a mixture of 126 parts of toluene, 77 parts of ethyl acetate, and 37 parts of ethyl ether. Procedures were otherwise as described in the preceding examples. The compositions were as follows:

| | | Proportions | |
|---|---|---|---|
| Comp. No. | Material | Percent by weight | Ml./100 g., total n.v. |
| 1 | Cellulose acetate butyrate, EAB-500-1 | 17 | 14.5 |
| | Petroleum oil, Mobilsol L | 19 | 21.3 |
| | Polyisobutylene, Polyvis 10 SH | 12 | 13.5 |
| | Hydrogenated methyl ester of rosin, Hercolyn D. | 17 | 16.8 |
| | Pentaerythritol ester of resin acids, Pentalyn 344. | 35 | 33.0 |
| 2 | Cellulose acetate butyrate, EAB-531-1 | 17.6 | 15.0 |
| | Petroleum oil, Mobilsol L | 18.0 | 20.2 |
| | Polyisobutylene, Polyvis 10 SH | 12.0 | 13.5 |
| | Hydrogenated methyl ester of rosin, Hercolyn D. | 52.4 | 51.9 |
| 3 | Cellulose acetate butyrate, EAB-500-1 | 14 | 12.0 |
| | Petroleum oil, Mobilsol L | 18 | 20.2 |
| | Polyisobutylene, Polyvis 10 SH | 12 | 13.5 |
| | Hydrogenated methyl ester of rosin, Hercolyn D. | 56 | 55.5 |
| 4 | Cellulose acetate butyrate, EAB-500-1 | 17.6 | 15.0 |
| | Petroleum oil, Mobilsol L | 18.8 | 21.1 |
| | Polyisobutylene, Polyvis 10 SH | 12.0 | 13.5 |
| | Monomeric pentaerythritol ester, Hercoflex 600. | 34.4 | 34.4 |
| | Pentaertyhritol ester of resin acids, Pentalyn 344. | 17.2 | 16.2 |
| 5 | Cellulose acetate butyrate, EAB-500-1 | 17.1 | 14.6 |
| | Petroleum oil, Mobilsol L | 18.1 | 20.3 |
| | Polyisobutylene, Polyvis 10 SH | 11.4 | 12.8 |
| | Pentaerythritol ester of resin acids, Pentalyn 344. | 34.0 | 32.1 |
| | Polyoxyethylene (8) stearate, MYRJ 45 | 19.4 | 19.4 |
| 6 | Cellulose acetate butyrate, EAB-500-1 | 15.6 | 13.3 |
| | Petroleum oil, Mobilsol L | 16.5 | 18.5 |
| | Polyisobutylene, Polyvis 10 SH | 12.6 | 14.1 |
| | Magnesium stearate | 12.2 | 11.9 |
| | Pentaerythritol ester of resin acids, Pentalyn 344. | 31.6 | 29.2 |
| | Hydrogenated methyl ester of rosin, Hercolyn D. | 11.5 | 11.4 |

Pentalyn 344 (Hercules Powder Company) is a pentaerythritol ester of stabilized resin acids having as typical properties: a softening point of 232° F. by the Hercules drop method, a Gardner-Holdt viscosity at 25° C. of E–F at 60% concentration in mineral spirits, and an acid number of 10. Hercoflex 600 (Hercules Powder Company) is a monomeric pentaerythritol ester having a saponification number of 410, a boiling point of 261° C. at 4 mm. Hg, and a viscosity of 50 centistokes at 25° C. MYRJ 45 (Atlas Chemical Industries) is a soft waxy solid non-ionic-emulsifier having an acid number of 0–1, a saponification number of 87–97, a hydroxy number of 85–100, and a water content of 2.5–3%.

The stencil from composition 1 when imaged on a Thermofax "Secretary" machine set at 5 gave excellent prints. There was no undesirable sticking and the amount of interaction with a carbon original was not excessive.

The stencil from composition 2 produced slightly broken prints.

Composition 1 has a compatibility temperature of about 320° F. The dried stencil coating melts to a two-phase liquid at about 290° F.

The stencils from compositions 3 and 4 when imaged at machine settings of 7 and 6½, respectively, gave excellent prints. Both stencils also can be imaged on a typewriter as readily as conventional type-impressible stencils. Both stencils were slightly oily.

The stencil from composition 5 gave good prints at a machine setting of 6, and was slightly oily.

The stencil from composition 6 produced slightly broken prints at a machine setting of 4½.

Example 9

Coating compositions similar to composition 1 of Example 8 were prepared, varying the resin acid ester. Stencils were prepared with the compositions dissolved in the first solvent mixture of Example 8 and were tested, as described in the preceding examples. The compositions were compounded as follows:

| Material | Proportions: Percent by weight | Proportions: Ml./100 g., total n.v. |
|---|---|---|
| Cellulose acetate butyrate, EAB-500-1 | 17.2 | 14.7 |
| Petroleum oil, Mobilsol L | 15.7 | 17.7 |
| Petroleum oil, Mobilsol K | 2.7 | 2.7 |
| Polyisobutylene, Polyvis 10 SH | 11.8 | 13.3 |
| Hydrogenated methyl ester of resin, Hercolyn D | 17.1 | 16.9 |
| Ester of resin acids | 35.4 | 33.4 |

Stencils prepared employing Pentalyn 344 or Pentalyn A as the resin acid ester gave excellent prints when imaged at a machine setting of 3 or 4, with minimum sticking and did not transfer a large amount of carbon and oil onto the prints. The results were nearly as good employing Pentalyn 342 or Permalyn 330 as the resin acid ester.

The several resin acid esters are products of Hercules Powder Company. Pentalyn 344, described in Example 8, is a pentaerythritol ester of stablized resin acids. Pentalyn A is a pentaerythritol ester of rosin having the typical properties: softening point of 232° F., a Gardner-Holdt viscosity at 25° C. of G at 60% concentration in mineral spirits, and an acid number of 12. Pentalyn 343 is a mixed polyol ester of stabilized resin acids having the typical properties: softening point of 192° F., a Gardner-Holdt viscosity at 25° C. of N at 70% concentration in toluene, and an acid number of 7. Permalyn 330 is a glycerol ester of stabilized resin acids having the typical properties: softening point of 189° F., a Gardner-Holdt viscosity at 25° C. of J–K at 75% concentration in toluene, and an acid number of 7.

Example 10

A coating composition similar to composition 1 of Example 8 was prepared, substituting pentaerythritol tetrastearate for the resin acid ester. Stencils were prepared and tested in the manner of the preceding examples, employing the following composition:

| Materials | Proportions: Percent by weight | Proportions: Ml./100 g., total n.v. |
|---|---|---|
| Cellulose acetate butyrate, EAB-500-1 | 16.3 | 13.9 |
| Petroleum oil, Mobilsol L | 17.7 | 20.0 |
| Polyisobutylene, Polyvis 10 SH | 11.1 | 12.5 |
| Hydrogenated methyl ester of rosin, Hercolyn D | 16.5 | 16.4 |
| Pentaerythritol tetrastearate | 38.4 | 38.6 |

The materials were dissolved at 38.2% concentration in a solvent mixture of 80.8 parts toluene and 81.2 parts isopropyl acetate, by weight, with warming. The tetrastearate tends to precipitate upon standing at room temperature, forming a suspension in a solution of the remaining materials.

Thermographic prints made from a stencil coated with the solution at about 90–100° F. were good. The imaging speed of the stencil was slightly faster than when using composition 1 of Example 8.

It was found that a stencil giving good thermographic prints could also be made by coating a base sheet with the solution containing suspended tetrastearate at room temperature. The coated base sheet had a cloudy waxlike appearance.

Example 11

The following coating composition and a stencil were prepared and tested as described in the preceding examples, with the composition dissolved at a concentration of 38.2% in a mixture of 70 parts toluene and 93 parts isopropyl acetate, by weightfi for coating:

| Material | Proportions: Percent by weight | Proportions: Ml./100 g., total n.v. |
|---|---|---|
| Cellulose acetate butyrate, EAB-500-1 | 18.4 | 15.7 |
| Petroleum oil, Mobilsol L | 13.7 | 15.4 |
| Polyisobutylene, Polyvis 10 SH | 8.2 | 9.2 |
| Monomeric Pentaerythritol ester, Hercoflex 600. | 43.3 | 43.3 |
| Chloronaphthalenes, Halowax 1001 | 16.4 | 10.4 |

Halowax 1001 (Koppers Company) is a mixture of tri- and tetrachloronaphthalenes, a white crystalline waxlike solid with 50% chlorine content melting at 194–204° F.

The stencil makes very good prints after imaging at a machine setting of 7½. It types very easily on a typewriter and is sensitive enough for use on most computer printers. There is no problem with sticking or excessive oil during thermographic imaging.

Example 12

The following compositions provided commercially acceptable thermographic stencils in the manner of the preceding examples:

| Comp. No. | Material | Proportions: Percent by Weight | Proportions: Ml./100 g., total n.v. |
|---|---|---|---|
| 1 | Cellulose acetate butyrate, EAB-500-1 | 17 | 14.5 |
| | Castor oil AA | 26 | 27.1 |
| | Sorbitan monooleate, Span 80 | 10 | 10.0 |
| | Pentaerythritol ester of resin acids, Pentalyn 344. | 47 | 44.3 |
| 2 | Cellulose acetate butyrate, EAB-500-1 | 19.6 | 16.8 |
| | Oleyl alcohol, Adol 34 | 59.9 | 73.0 |
| | Sorbitan monooleate, Span 80 | 10 | 10.0 |
| | Chloronaphthalenes, Halowax 1001 | 10.5 | 6.6 |
| 3 | ellulose acetate butyrate, EAB-500-1 | 17.3 | 14.8 |
| | Oleyl alcohol, Adol 34 | 16.7 | 20.4 |
| | Polyisobutylene, Polyvis 10 SH | 12.3 | 13.8 |
| | Hydrogenated methy lester of rosin, Hercolyn D. | 17.6 | 17.4 |
| | Pentaerythritol ester of resin acids, Pentalyn 344. | 36.1 | 34.1 |

In preparing the stencil coating solutions, compositions 1 and 2 were dissolved at 38% concentration in a mixture of 132.3 parts toluene, 18 parts ethyl acetate, and 12.7 parts ethanol (95%), by weight. Composition 3 was dissolved at 38% concentration in a mixture of 76.5 parts toluene and 86.5 parts isopropyl acetate.

Adol 34 (Archer Daniels Midland Company) oleyl alcohol is an oily liquid mixture of oleyl, cetyl and stearyl alcohols, having the properties: acid value of 1 max., OH value of 210–230, iodine value of 60–70, cloud point of 26° C. max., and saponification value of 3 max.

Example 13

A stencil was prepared from the following composition in the manner of the preceding examples, with the composition dissolved for coating at 33.3% concentration in a mixture of 75 parts toluene, 105 parts ethyl acetate, and 20 parts ethanol, by weight.

| Material: | Percent by wt. |
|---|---|
| Cellulose acetate propionate, ½ sec. | 27.2 |
| Petroleum oil, Mobilsol 66 | 72.8 |

Cellulose acetate propionate, ½ second (Eastman Chemical Products) has an average propionyl content of 45.5% (range, 44 to 47%), an average acetyl content of 2.5%, a viscosity of 0.3 to 0.5 second by the A.S.T.M. method, and a melting point of 392 to 410° F.

The stencil made fair prints when imaged at a "Secretary" machine setting of 5½.

Other cellulose esters such as cellulose acetate valerate and cellulose propionate butyrate would produce satisfactory stencils.

Example 14

Stencils were prepared from the following composition in the manner of the preceding examples:

| Material | Proportions | |
|---|---|---|
| | Percent by weight | Ml./100 g., total n.v. |
| Cellulose acetate butyrate, EAB-500-1 | 9.6 | 8.2 |
| Vinyl chloride-vinyl acetate copolymer, Bakelite VYHD | 5.2 | 3.8 |
| Petroleum oil, American No. 11 | 34.7 | 38.8 |
| Hydrogenated methyl ester of rosin, hercolyn D | 50.5 | 50.0 |

Bakelite resin VYHD (Union Carbide Corporation) is a low molecular weight copolymer of 84 to 87% by weight vinyl chloride and the balance vinyl acetate. It has a viscosity of 150 to 200 centipoises at 25° C. in 25% solution in 65:35 toluene: methyl ethyl ketone, American Oil Company No. 11 oil has a viscosity of 100 Saybolt seconds at 100° F. and an aniline point of 172° F.

The composition was dissolved at 44.3% concentration in a mixture of 96.9 parts toluene and 29.2 parts ethyl acetate, by weight.

Excellent prints were produced from the stencils.

Example 15

A stencil was prepared in the manner of the preceding examples from the following composition containing a clay pigment:

| Material | Proportions | |
|---|---|---|
| | Percent by weight | Ml./100 g., total n.v.[1] |
| Cellulose acetate butyrate, EAB-500-1 | 13.4 | 11.5 |
| Petroleum oil, American No. 11R industrial oil | 32.2 | 36.0 |
| Hydrogenated methyl ester of rosin, Hercolyn D | 46.5 | 46.0 |
| Clay, Glomax JJ (Goergia Kaolin Company) | 7.8 | |

[1] Excluding clay, which constitutes about 3% of coating volume.

The composition was incorporated for coating at 46% concentration in a mixture of 94.5 parts toluene, 13.1 parts ethyl acetate, and 9.4 parts ethanol, by weight.

The stencil gave excellent thermographic prints. The stencil also had enough pressure sensitivity to be imagable on most computer printers.

Example 16

A black thermographic stencil that may be imaged as illustrated in FIGS. 5 and 6 was made by mixing carbon black with composition 1 of Example 8, in a proportion of 5% by weight of all non-volatile materials. The carbon black was ground in the plasticizers. The composition was applied to a stencil base sheet in the manner of Example 8.

Another black thermographic stencil having the same utility was made by applying composition 1 of Example 8 to a black base sheet in the same manner. The base sheet was an infra-red absorbing black tissue sheet identified as X 1315 (Dexter Corporation).

The stencils gave good copy when imaged with a negative original 46 made of conventional oiled "stencilboard" and having ¾-inch high letter openings 50.

We claim:

1. A thermographic stencil sheet which comprises an ink-pervious base sheet, and an ink-impervious coating thereon of a heat-flowable composition of (a) resinous thermoplastic cellulose organic ester film-forming material, and (b) an oily, substantially non-volatile plasticizing material, said plasticizing material being partially but incompletely compatible with said cellulose ester, the amount of (a) being about 8–50% by weight based on the total amount of (a) plus (b), said composition forming a homogeneous single phase melt when heated and forming a two-phase mixture at a minimum temperature of about 120° F. when cooled from said single phase melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof, and said coating being provided on said base sheet by deposition of said composition on the base sheet from a solvent solution thereof and removing said solvent therefrom, the melting point of said coating being at least about 150° F., said coating further becoming flowable and irreversibly physically altered when heated to its melting point for forming ink permeable image areas in the cooled stencil.

2. A stencil sheet as defined in claim 1 wherein said film-forming material comprises cellulose acetate butyrate.

3. A stencil sheet as defined in claim 1 wherein said film forming material comprises cellulose acetate propionate.

4. A stencil sheet as defined in claim 1 wherein said coating has a melting point of about 150–320° F.

5. A stencil sheet as defined in claim 2 wherein said coating has a melting point of about 150–320° F.

6. A stencil sheet as defined in claim 1 wherein said coating has a melting point of from about 200–300° F.

7. A stencil sheet as defined in claim 2 wherein said cellulose acetate butyrate has a butyryl content of about 35–55% and an acetyl content of about 1.5–13%, by weight.

8. A thermographic stencil sheet which comprises an ink-pervious base sheet, and an ink-impervious coating thereon of a heat-flowable composition of (a) resinous thermoplastic cellulose organic ester film-forming material, and (b) plasticizing material comprising a member selected from the group consisting of mineral oil, castor oil, oleyl alcohol, and polyisobutylene, the amount of (a) being about 8–50% by weight based on the total amount of (a) plus (b), said composition forming a homogeneous single phase melt when heated and forming a two-phase mixture at a minimum temperature of about 120° F. when cooled from said single phase melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof, and said coating being provided on said base sheet by deposition of said composition on the base sheet from a solvent solution thereof and removing said solvent therefrom, the melting point of said coating being in the range of about 150–320° F., said coating further becoming flowable and irreversibly physically altered when heated to its melting point for forming ink permeable image areas in the cooled stencil.

9. A stencil sheet as defined in claim 8 wherein about 10–90% by weight of mineral oil is present in said composition.

10. A stencil sheet as defined in claim 8 wherein said film-forming material comprises cellulose acetate butyrate.

11. A stencil sheet as defined in claim 8 wherein said film-forming material comprises cellulose acetate propionate.

12. A thermographic stencil sheet which comprises an ink-previous base sheet, and an ink-impervious coating thereon of a heat-flowable composition of, in proportions by weight of the composition, (a) about 8–50% of resinous thermoplastic ink-impervious film-forming material comprising a cellulose organic ester, and (b) plasticizing material comprising (1) about 10-90% of mineral oil having an aniline point in the range of about 50° F. (mixed) to 240° F. (straight), and (2) about 0–72% of an ester of a resin acid or of a hydrogenated resin acid, said composition forming a homogenous single phase melt when heated, and forming a two-phase mixture at a minimum temperature of about 120° F. when cooled from the melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof and removing said solvent therefrom, and said coating being provided on said base sheet by deposition of said composition on the base sheet from a solvent solution thereof, the melting point of said coating being in the range of about 150–320° F. said coating further becoming flowable and irreversibly physically altered when heated to its melting point for forming ink permeable image areas in the cooled stencil.

13. A stencil sheet as defined in claim 12 wherein said film-forming material comprises cellulose acetate butyrate.

14. A thermographic stencil sheet which comprises an ink-previous base sheet, and an ink-impervious coating thereon of a heat-flowable composition of, in proportions by weight of the composition, (a) resinous thermoplastic film-forming material comprising about 13–30% of cellulose acetate butyrate having a butyryl content of about 46–55%, and a viscosity of about 0.25–6 seconds, and (b) plasticizing material comprising (1) about 40–87% of petroleum oil having an aniline point in the range of about 100–180° F. (straight), and (2) about 0–47% of an ester of a resin acid or of a hydrogenated resin acid, said composition forming a homogenous single phase melt at a maximum temperature of about 320° F. and forming a two-phase mixture at a minimum temperature of about 120° F. when cooled from the melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof, and said coating being provided on said base sheet by deposition of said composition on the base sheet from a solvent solution thereof and removing said solvent therefrom, the melting point of said coating being in the range of about 150–320° F. said coating further becoming flowable and irreversibly physically altered when heated to its melting point for forming ink permeable image areas in the cooled stencil.

15. A method of making a thermographic stencil sheet which comprises coating an ink-previous base sheet with a solution in a volatile solvent of a soluble heat-flowable compositions of (a) resinous thermoplastic cellulose organic ester, and (b) plasticizing material, said plasticizing material being partially but incompletely compatible with said cellulose ester, the amount of (a) being about 8–50% by weight based on the total amount of (a) plus (b), and removing said solvent therefrom, said composition forming a homogenous single phase melt when heated, and forming a two-phase mixture at a minimum temperature of about 120° F. when cooled from said single phase melt, at least one phase of said mixture at room temperature incorporating substantial proportions of both said film-forming material and said plasticizing material, said composition forming a substantially homogeneous continuous imperforate coating when deposited from said solution, the melting point of said coating being in the range of about 150–320° F., said coating further becoming flowable and irreversibly physically altered when heated to its melting point for forming ink permeable image areas in the cooled stencil.

16. In a method of making an imaged stencil sheet employing a thermographic stencil sheet which includes an ink-impervious layer of a heat-flowable composition, wherein image areas of the stencil sheet are subjected to heat generated by infra-red ray absorption to render the composition flowable in the image areas and the composition is caused to flow therefrom and thereby form corresponding ink-transmitting image openings in the stencil sheet, the improvement which comprises employing as said stencil sheet the stencil sheet of claim 1.

17. In a method of making an imaged stencil sheet employing a thermographic stencil sheet which includes an ink-previous layer of a heat-flowable composition, wherein image areas of the stencil sheet are subjected to heat generated by infra-red ray absorption to render the composition flowable in the image areas and the composition is caused to flow therefrom and thereby form corresponding ink-transmitting image openings in the stencil sheet, the improvement which comprises employing as said stencil sheet the stencil sheet of claim 8.

18. In an assembly for making an imaged stencil sheet including a thermographic stencil sheet which includes an ink-impervious layer of a heat-flowable composition, and an absorbent sheet arranged for surface contact with said stencil sheet for absorbing said composition from said stencil sheet when rendered flowable by heat, the improvement which comprises employing as said stencil sheet the stencil sheet of claim 1.

19. In an assembly for making an imaged stencil sheet including a thermographic stencil sheet which includes an ink-impervious layer of a heat-flowable composition, and an absorbent sheet arranged for surface contact with said stencil sheet for absorbing said composition from said stencil sheet when rendered flowable by heat, the improvement which comprises employing as said stencil sheet the stencil sheet of claim 12.

20. A thermographic stencil sheet which comprises an ink-previous base sheet, and an ink-impervious coating thereon of a heat-flowable composition of (a) resinous thermoplastic ink-impervious film-forming material comprising a cellulose organic ester, and (b) plasticizing material, said plasticizing material being partially but incompletely compatible with said cellulose ester, the amount of (a) being about 8–50% by weight based on the total amount of (a) plus (b), said composition forming a homogenous single phase melt when heated, and forming a two-phase mixture at a minimum temperature of about 120° F. when cooled from said single phase melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof, and said coating being provided on said base sheet by deposition of said composition on the base sheet from a solvent solution thereof and removing said solvent therefrom, the melting point of said coating being at least about 150° F., said coating further becoming flowable and irreversibly physically altered when heated to its melting point for forming ink permeable image areas in the cooled stencil.

21. A thermographic stencil sheet which comprises an ink-previous base sheet, and an ink-imprevious coating thereon of a heat-flowable composition of (a) resinous thermoplastic ink-impervious film-forming material comprising a cellulose organic ester, and (b) plasticizing material, said plasticizing material being partially but incompletely compatible with said cellulose ester, the amount of (a) being about 8–50% by weight based on the total amount of (a) plus (b), said composition forming a homogenous single phase melt when heated, and forming a two-phase mixture at a minimum temperature of about 170° F. when cooled from said single phase melt, at least one phase of said mixture at room temperature incorporating substantial proportions of both said film-forming material and said plasticizing material, said composition being soluble in a volatile solvent and forming a substantially homogeneous continuous imperforate coating when deposited from a solution thereof, and said coating being provided on said base sheet by deposition of said composition on the base sheet from a solvent solution thereof and removing said solvent therefrom, the melting point of said coating being at least about 150° F., said coating further becoming flowable and irreversibly physically altered when heated to its melting point for forming ink permeable image areas in the cooled stencil.

22. A thermographic stencil sheet as in claim 7 wherein the amount of said film-forming material is about from 8–30% by weight and said plasticizing material comprises mineral oil.

23. A thermographic stencil sheet as in claim 7 wherein the amount of said film-forming material is about from 16–20% by weight and said plasticizing material comprises mineral oil.

References Cited

UNITED STATES PATENTS

| | | | |
|---|---|---|---|
| 1,790,987 | 2/1931 | Horii | 117—35.5 |
| 1,792,095 | 2/1931 | Horii | 117—35.5 |
| 2,808,777 | 10/1957 | Roshkind | 117—36.1 |
| 3,062,675 | 11/1962 | Shelffo | 117—35.5 |
| 3,120,611 | 2/1964 | Lind | 117—36.1 |
| 3,177,086 | 4/1965 | Newman et al. | 117—36.1 |
| 3,250,637 | 5/1966 | Frasher et al. | 117—35.5 |
| 3,368,989 | 2/1968 | Wissinger et al. | 117—36.1 |
| 3,446,662 | 5/1969 | Newman | 117—36.1 |

MURRAY KATZ, Primary Examiner

U.S. Cl. X.R.

117—157; 106—189, 191; 250—65 T

PO-1050
(5/69)

UNITED STATES PATENT OFFICE
CERTIFICATE OF CORRECTION

Patent No. 3,694,245 Dated September 26, 1972

Inventor(s) Bror E. Anderson et al

It is certified that error appears in the above-identified patent and that said Letters Patent are hereby corrected as shown below:

Column 1, after line 7, insert -- assignors to Weber Marking Systems, Inc., Arlington Heights, Illinois --

Column 21, line 16 "weightfi for" should read -- weight for --

Column 25, line 11 "ink-previous" should read -- ink-pervious -- "ink-imprevious" should read -- ink-impervious -- line 44 "ink-previous" should read -- ink-pervious -- "ink-imprevious" should read -- ink-impervious --

Column 26, line 4 "ink-previous" should read -- ink-pervious -- line 39 "ink-previous" should read -- ink-pervious -- line 64 "ink-previous" should read -- ink-pervious -- "ink-imprevious" should read -- ink-impervious --

Signed and sealed this 22nd day of May 1973.

(SEAL)
Attest:

EDWARD M.FLETCHER,JR.
Attesting Officer

ROBERT GOTTSCHALK
Commissioner of Patents